US010284375B2

(12) United States Patent
Thom et al.

(10) Patent No.: US 10,284,375 B2
(45) Date of Patent: May 7, 2019

(54) TRUST SERVICE FOR A CLIENT DEVICE

(71) Applicant: Microsoft Technology Licensing, LLC, Redmond, WA (US)

(72) Inventors: Stefan Thom, Snohomish, WA (US); Ronald Aigner, Redmond, WA (US); Dennis J. Mattoon, Redmond, WA (US); Stuart H. Schaefer, Sammamish, WA (US); Merzin Kapadia, Newcastle, WA (US); Robert Karl Spiger, Seattle, WA (US); David R. Wooten, Greenville, SC (US); Paul England, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/654,126

(22) Filed: Jul. 19, 2017

(65) Prior Publication Data
US 2018/0131523 A1    May 10, 2018

Related U.S. Application Data

(62) Division of application No. 14/519,010, filed on Oct. 20, 2014, now Pat. No. 9,735,968.

(51) Int. Cl.
*G06F 21/45* (2013.01)
*H04L 9/32* (2006.01)
(Continued)

(52) U.S. Cl.
CPC ............ *H04L 9/3247* (2013.01); *G06F 21/53* (2013.01); *G06F 21/629* (2013.01); *G06F 21/72* (2013.01);
(Continued)

(58) Field of Classification Search
None
See application file for complete search history.

(56) References Cited

U.S. PATENT DOCUMENTS 6,418,472 B1 * 7/2002 Mi ..................... G06F 21/6218
709/202
7,194,762 B2    3/2007 Challener et al.
(Continued)

FOREIGN PATENT DOCUMENTS

EP    2354994    8/2011

OTHER PUBLICATIONS

JP2003060714A. English Translation. (Year: 2003).*
(Continued)

*Primary Examiner* — Venkat Perungavoor
(74) *Attorney, Agent, or Firm* — Liang IP, PLLC

(57) ABSTRACT

Techniques for a trust service for a client device are described. In various implementations, a trust service is implemented remotely from a client device and provides various trust-related functions to the client device. According to various implementations, communication between a client device and a remote trust service is authenticated by a client identifier (ID) that is maintained by both the client device and the remote trust service. In at least some implementations, the client ID is stored on a location of the client device that is protected from access by (e.g., is inaccessible to) device components such as an operating system, applications, and so forth. Thus, the client ID may be utilized to generate signatures to authenticate communications between the client device and the remote trust service.

20 Claims, 14 Drawing Sheets

(51) Int. Cl.
   *G06F 21/53* (2013.01)
   *H04L 29/06* (2006.01)
   *G06F 21/62* (2013.01)
   *G06F 21/72* (2013.01)

(52) U.S. Cl.
   CPC ...... *H04L 63/0428* (2013.01); *H04L 63/0876* (2013.01); *H04L 63/102* (2013.01); *G06F 2221/034* (2013.01)

(56) References Cited

U.S. PATENT DOCUMENTS

| | | | |
|---|---|---|---|
| 7,516,480 B2 | 4/2009 | Pearson et al. | |
| 8,443,204 B2* | 5/2013 | Hauck | G06F 21/575 713/187 |
| 8,495,361 B2 | 7/2013 | Catherman et al. | |
| 8,560,839 B2 | 10/2013 | Barham et al. | |
| 8,751,781 B2 | 6/2014 | Konetski et al. | |
| 9,735,968 B2 | 8/2017 | Thom et al. | |
| 9,887,848 B2* | 2/2018 | Pedersen | H04L 9/3268 |
| 2004/0153646 A1 | 8/2004 | Smith | |
| 2005/0120219 A1 | 6/2005 | Munetoh et al. | |
| 2008/0046581 A1 | 2/2008 | Molina et al. | |
| 2009/0158032 A1* | 6/2009 | Costa | H04L 63/0442 713/156 |
| 2009/0172639 A1 | 7/2009 | Natu et al. | |
| 2009/0271870 A1 | 10/2009 | Vepsalainen | |
| 2010/0095120 A1 | 4/2010 | Thom et al. | |
| 2010/0146295 A1 | 6/2010 | Proudler | |
| 2010/0325424 A1* | 12/2010 | Etchegoyen | H04L 63/0853 713/155 |
| 2011/0161672 A1 | 6/2011 | Martinez et al. | |
| 2012/0163589 A1 | 6/2012 | Johnson et al. | |
| 2014/0089660 A1 | 3/2014 | Sarangshar et al. | |
| 2014/0166744 A1 | 6/2014 | Crews | |
| 2015/0033004 A1 | 1/2015 | Smeets et al. | |
| 2016/0112203 A1 | 4/2016 | Thom et al. | |

OTHER PUBLICATIONS

"A Security-Enhanced Remote Platform Integrity Attestation Scheme", 5th International Conference on: Wireless Communications, Networking and Mobile Computing, 2009, 4 pages.

"Final Office Action", U.S. Appl. No. 14/519,010, dated May 18, 2016, 10 pages.

"International Preliminary Report on Patentability", Application No. PCT/US2015/056119, dated Aug. 30, 2016, 8 pages.

"International Search Report and Written Opinion", Application No. PCT/US2015/056119, dated Dec. 9, 2015, 14 pages.

"Non-Final Office Action", U.S. Appl. No. 14/519,010, dated Nov. 4, 2016, 13 pages.

"Non-Final Office Action", U.S. Appl. No. 14/519,010, dated Nov. 10, 2015, 11 pages.

"Notice of Allowance", U.S. Appl. No. 14/519,010, dated Apr. 19, 2017, 8 pages.

Bueso,"Scalability Techniques for Practical Synchronization Primitives", Retrieved at: http://queue.acm.org/detail.cfm?id=2698990, Dec. 14, 2014, 14 pages.

Damgard,"Secure Key Management in the Cloud", Third International Conference on Grids and Cooperative Computing, Dec. 17, 2013, 34 pages.

Jing-Jang,"A Business Model for Cloud Computing Based on a Separate Encryption and Decryption Service", International Conference on Information Science and Applications (ICISA), Apr. 26, 2011, 7 pages.

Rahmani,"Encryption as a Service (EaaS) as a Solution for Cryptography in Cloud", Procedia Technology, Jun. 25, 2013, pp. 1202-1210.

Seol,"Secure Storage Service for IaaS Cloud Users", IEEE/ACM International Symposium on Cloud and Grid Computing, May 13, 2013, pp. 190-191.

Stumpf,"A Robust Integrity Reporting Protocol for Remote Attestation", Proceedings of the Second Workshop on Advances in Trusted Computing, Jan. 1, 2006, 12 pages.

* cited by examiner

TRUST SERVICE FOR A CLIENT DEVICE

RELATED APPLICATION

This application is a division of and claims priority to U.S. patent application Ser. No. 14/519,010, filed Oct. 12, 2014, entitled "Trust Service for a Client Device", the entire disclosure of which is hereby incorporated by reference herein in its entirety.

BACKGROUND

As computers have become increasingly commonplace, increasing amounts of data have been stored on computers. This has many benefits for users, including the ability to store large amounts of data in relatively small spaces. However, some of this data is oftentimes intended to be kept secret or revealed to only certain individuals. This data can be protected in different manners, such as using passwords or personal identification numbers. Although such protection can be helpful, computers can be vulnerable to attacks such as dictionary attacks or brute force attacks where numerous attempts to guess the password or personal identification number are made. These vulnerabilities can lead to users having reduced trust in their computers, which detracts from a positive user experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for a trust service for a client device are described. In various implementations, a trust service is implemented remotely from a client device and provides various trust-related functions to the client device. The trust service, for instance, may maintain security assets for the client device, such as security keys, protected data, encryption/decryption algorithms, and so forth. According to various implementations, communication between a client device and a remote trust service is authenticated by a client identifier (ID) that is maintained by both the client device and the remote trust service. In at least some implementations, the client ID is stored on a location of the client device that is protected from access by (e.g., is inaccessible to) device components such as an operating system, applications, and so forth. Thus, the client ID may be utilized to generate signatures to authenticate communications between the client device and the remote trust service.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for a trust service for a client device are described. In various implementations, a trust service is implemented remotely from a client device and provides various trust-related functions to the client device. The trust service, for instance, may maintain security assets for the client device, such as security keys, protected data, encryption/decryption algorithms, and so forth.

According to various implementations, communication between a client device and a remote trust service is authenticated by a client identifier (ID) that is maintained by both the client device and the remote trust service. In at least some implementations, the client ID is stored on a location of the client device that is protected from access by (e.g., is inaccessible to) device components such as an operating system, applications, and so forth. Thus, the client ID may be utilized to generate signatures to authenticate communications between the client device and the remote trust service.

According to various implementations, techniques discussed herein provide trust services to a client device without the client device implementing its own hardware-based trust environment. For instance, a remote trust service can provide trusted platform module functionality to a client device without the client device having a local trusted platform module. Thus, manufacturing costs may be conserved by obviating the need for a local trusted platform module on a client device, while providing the client device with trusted platform module functionality via a remote service. Further, processing and memory resources on a client device (e.g., CPU bandwidth, data storage space, and so forth) may be conserved by offloading trust operations for the client device to a remote trust service.

In the following discussion, an example environment is first described that is operable to employ techniques described herein. Next, a section entitled "Example Procedures" describes some example methods trust service for a client device in accordance with one or more embodiments. Finally, a section entitled "Example System and Device" describes an example system and device that are operable to employ techniques discussed herein in accordance with one or more embodiments.

Example Environment

Figure 1:
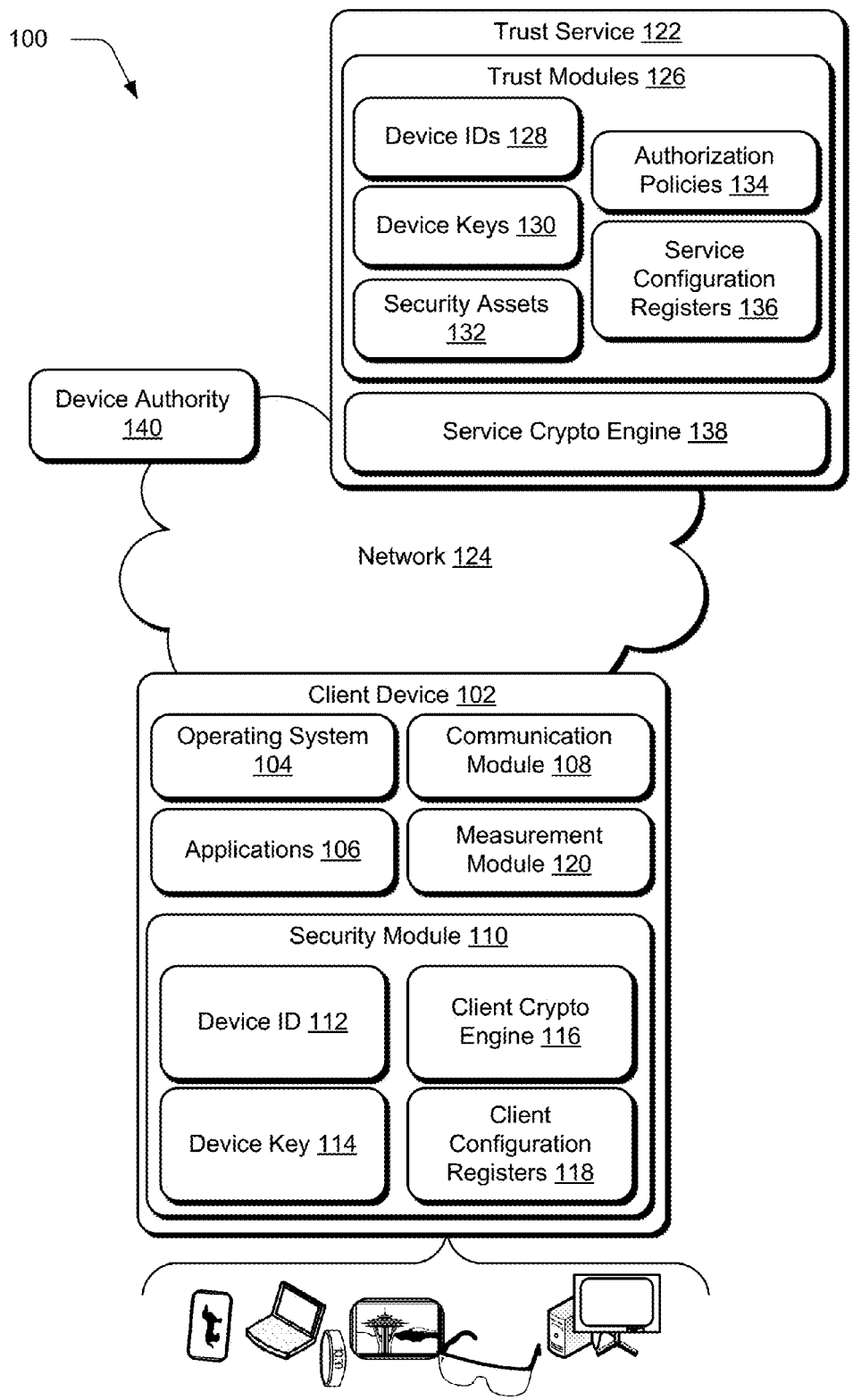
FIG. 1 is an illustration of an environment in an example implementation that is operable to employ techniques discussed herein in accordance with one or more embodiments.

FIG. 1 is an illustration of an environment 100 in an example implementation that is operable to employ techniques for trust service for a client device discussed herein. Environment 100 includes a client device 102 which can be embodied as any suitable device such as, by way of example and not limitation, a smartphone, a tablet computer, a portable computer (e.g., a laptop), a desktop computer, a wearable device, and so forth. In at least some implementations, the client device 102 represents a smart appliance, such as a thermostat, a refrigerator, a humidity sensor, security hardware (e.g., cameras, motion sensors, and so forth), a light fixture, a door locking system, and so forth. Thus, the client device 102 may range from a system with significant processing power, to a lightweight device with minimal processing power. One of a variety of different examples of a client device 102 is shown and described below in FIG. QQ.

The client device 102 includes a variety of different functionalities that enable various activities and tasks to be performed. For instance, the client device 102 includes an operating system 104, applications 106, and a communication module 108. Generally, the operating system 104 is representative of functionality for abstracting various system components of the client device 102, such as hardware, kernel-level modules and services, and so forth. The operating system 104, for instance, can abstract various components of the client device 102 to the applications 106 to enable interaction between the components and the applications 106.

The applications 106 are representative of functionality to enable various tasks and activities to be performed via the client device 102, such as for observing various phenomena, reporting events, changing device settings and/or configuration, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 108 is representative of functionality for enabling the client device 102 to communication over wired and/or wireless connections. For instance, the communication module 108 represents hardware and logic for communication via a variety of different wired and/or wireless technologies and protocols.

The client device 102 further includes a security module 110, which is representative of a portion of the client device 102 that protected from general access by most or all other functionalities of the client device 102. The security module 110 can be implemented in various ways, such as a separate, dedicated hardware environment (e.g., a dedicated chip), a subdivided portion of an existing hardware environment (e.g., a sub-portion of a central processing unit (CPU)), a protected firmware environment, and so forth. According to various implementations, the operating system 104 and/or the applications 106 may communicate with the security module 110, but may not access data and functionality that is maintained within the security module 110.

The security module 110 includes data, logic, and functionality that enable various aspects of techniques for trust service for a client device. For instance, the security module 110 includes a device identifier (ID) 112, a device key 114, a client cryptographic (crypto) engine 116, and client configuration registers 118. Generally, the device ID 112 is representative of an identifier that distinguishes the client device 102 from other client devices. The device ID 112, for instance, may correspond to a randomly-generated value that is bound to the client device 102. Alternatively or additionally, the device ID 112 may correspond to a cryptographic value generated by the client crypto engine 116, such as by applying the device key 114 to a particular data value to generate the device ID 112. This is not intended to be limiting, however, and the device ID 112 may be generated in a variety of other ways while remaining within the spirit and scope of the implementations discussed herein.

Generally, the device key 114 is representative of a cryptographic key that is generated according to any suitable cryptographic protocol. According to various implementations, the device key 114 is permanently stored within the security module 110 and cannot be accessed by an external entity, such as the operating system 104, the applications 106, and so forth. The device key 114, for instance, is stored in a programmable read-only memory (PROM) that is only accessible by the security module 110.

The client crypto engine 116 is representative of functionality to perform various cryptographic functions for the security module 110 and/or the client device 102. For instance, the client crypto engine 116 may perform encryption and decryption tasks. According to various implementations, the client crypto engine 116 may operate according to one or more of a variety of different cryptographic protocols, such as the Secure Hash Algorithm (SHA) protocols, RSA, MD5, and so forth. In at least some implementations, the crypto engine QQ may encrypt and decrypt data utilizing a key derived using a Hash-based Message Authentication Code (HMAC).

According to various implementations, the client configuration registers 118 are representative of functionality for storing "measurements" of various system components, such as measurements of modules of the operating system 104 that are collected at a system boot time. For instance, a measurement module 120 of the client device 102 may capture measurements and store them as part of the client configuration registers 118.

Generally, a "measurement" refers to a way of identifying and/or characterizing various device-related data, such as code components of the client device 102, configuration data of the client device 102, and so forth. As used herein, the term "code component" generally refers to portions of executable code, such as portions of the applications 106, services, modules of the operating system 104, processes, various binaries and/or executables, configuration data, and so forth. Examples of measurements include hash values generated from device-related data, data signatures, encrypted versions of device-related data and/or portions of device-related data, and so forth. A measurement, for instance, may be generated by applying an SHA to device-related data, e.g., SHA-1, SHA-2, and so forth.

According to various implementations, measurements of device-related data may be captured by the measurement module 120 at system boot time and stored in the client configuration registers 118. Generally, the client configuration registers 118 store sequences of measurements for device-related data of the client device 102, with new values of a client configuration registers 118 being computed by appending a new measurement to an existing register value and computing a hash of the concatenated value. This process may be repeated for multiple different instances of device-related data, e.g., multiple code modules. As further detailed below, measurements of device-related data may be utilized to ascertain whether a state of the client device 102 has changed.

The environment 100 further includes a trust service 122, which is representative of functionality to provide various security-related services for the client device 102, as well as other devices and/or entities. Generally, communication between the client device 102 and the trust service 122 occurs over network(s) 124. The network(s) 124 may assume a variety of different configurations, such as a local area network (LAN), a wide area network (WAN), the Internet, and so on. The network(s) 124, for instance, may include a combination of wired and/or wireless networks that are implemented via any suitable wired and/or wireless protocol, and/or combinations thereof. In at least some implementations, functionalities discussed with reference to the environment 100 and/or other portions of the discussion herein may be implemented in a distributed environment (e.g., "over the cloud"), as further described in relation to FIG. QQ. The trust service 122, for instance, represents a cloud-based and/or distributed service that may be hosted at one or more network-based locations.

The trust service 122 maintains trust modules 126, which are representative of functionality for maintaining trust-related data and functionality for different entities. For instance, a particular trust module 126 represents a trust environment that stores trust-related data and functionality for the client device 102 such that access to the particular trust module is limited to the client device 102 and/or other entities authorized to access the particular trust module 126 for the client device 102. In at least some implementations, different instances of the trust modules 126 are individually identified with different devices such that a particular trust module 126 is associated with a single device.

According to one or more implementations, the trust modules 126 may be individually implemented as separate hardware environments, such as individual trusted platform modules. Generally, a trusted platform module refers to a functionality that is protected from general system access, such as a protected hardware and/or firmware environment. A trusted platform module, for instance, represents a tamper-resistant environment in which code can be safely executed and that protects security assets from unauthorized access.

Included as part of the trust modules 126 are device IDs 128, device keys 130, security assets 132, authorization policies 134, and service configuration registers 136. Generally, the device IDs 128 represent identifiers for different devices that have an associated trust module 126. For instance, a particular trust module 126 includes a device ID 128 that corresponds to the device ID 112 of the client device 102. According to various implementations, this enables a trust module 126 for the client device 102 to be located and accessed for various purposes.

The device keys 130 represent cryptographic keys for different devices, such as encryption keys, decryption keys, and so forth. For instance, a particular trust module 126 for the client device 102 maintains a particular device key 130 that corresponds to the device key 114, e.g., is identical to the device key 114. According to various implementations, this enables data that is encrypted using the device key 114 to be decrypted by the trust service 122 utilizing the particular device key 130.

Generally, the security assets 132 are representative of different types of security-related assets. The security assets 132, for instance, may include information that may be leveraged to verify the identities of certain entities, the authenticity and/or trusted status of various types of data, and so forth. Examples of the security assets 124 include security keys (e.g., cryptographic keys), security certificates, encryption and decryption algorithms, protected data, and so forth.

According to various implementations, the authorization policies 134 are representative of representative of functionality for specifying different conditions, rules, parameters, and instructions for controlling access to the security assets 132. For instance, individual authorization policies 134 may be bound to individual security assets 132 such that access to individual security assets 132 may be controlled via respective authorization policies 134. For instance, if a condition specified by a particular authorization policy 134 for access to a particular security asset 132 is not satisfied, access to the particular security asset 132 may be denied.

The service configuration registers 136 are representative of functionality for storing various device state information. For instance, a particular service configuration register 136 may store measurements for known good (e.g., safe) versions of components of the operating system 104. Thus, a known good measurement of a component of the operating system 104 from the particular service configuration register 136 may be compared to a current measurement of the component taken from the operating system 104. If the measurements match, this may indicate that the component is currently in a safe state. If the measurements don't match, this may indicate that the current version of the component has been changed (e.g., is not to be trusted), such as based on an unauthorized change to the operating system 104.

The trust service 122 further includes a service cryptographic (crypto) engine 138, which is representative of functionality to perform various cryptographic functions for the trust service 122. For instance, the service crypto engine 138 may perform encryption and decryption tasks. According to various implementations, the service crypto engine 138 may operate according to one or more of a variety of different cryptographic protocols, such as the SHA protocols, RSA, MD5, and so forth. In at least some implementations, the service crypto engine 138 may encrypt and decrypt data utilizing an HMAC-derived key.

Further illustrated as part of the environment 100 is a device authority 140, which is representative of an entity that has certain security privileges and/or responsibilities with regard to the client device 102. The device authority 140, for instance, represents a manufacturer of the client device 102. Alternatively or additionally, the device authority 140 represents an entity that administrates and/or maintains the client device 102, such as for issuing updates for components of the client device 102 (e.g., for software, firmware, and so forth), for issuing security assets for the client device 102, for repairing the client device 102, and so on.

According to various implementations, a trust module 126 for the client device 102 is configured via interaction between the device authority 140 and the trust service 122. For instance, the device authority 140 requests that the trust service 122 create a trust module 126 for the client device 102. Further to such a request, the device authority provides the trust service 122 with configuration parameters for the trust module 126, such as a device ID 128, a device key 130, security assets 132, and/or authorization policies 134 for the client device 102. The trust service 122 may then generate and provision a particular trust module 126 for the client device 102 using the configuration parameters.

Having described an example environment in which the techniques described herein may operate, consider now a discussion of an example implementation scenario in accordance with one or more embodiments.

Example Implementation Scenario

This section describes an example implementation scenario in accordance with one or more implementations. The implementation scenario may be implemented in the environment 100 described above, and/or any other suitable environment. The implementation scenario, for example, describes example operations of the client device 102, the trust service 122, and/or interactions between the client device 102 and the trust service 122.

Figure 2:
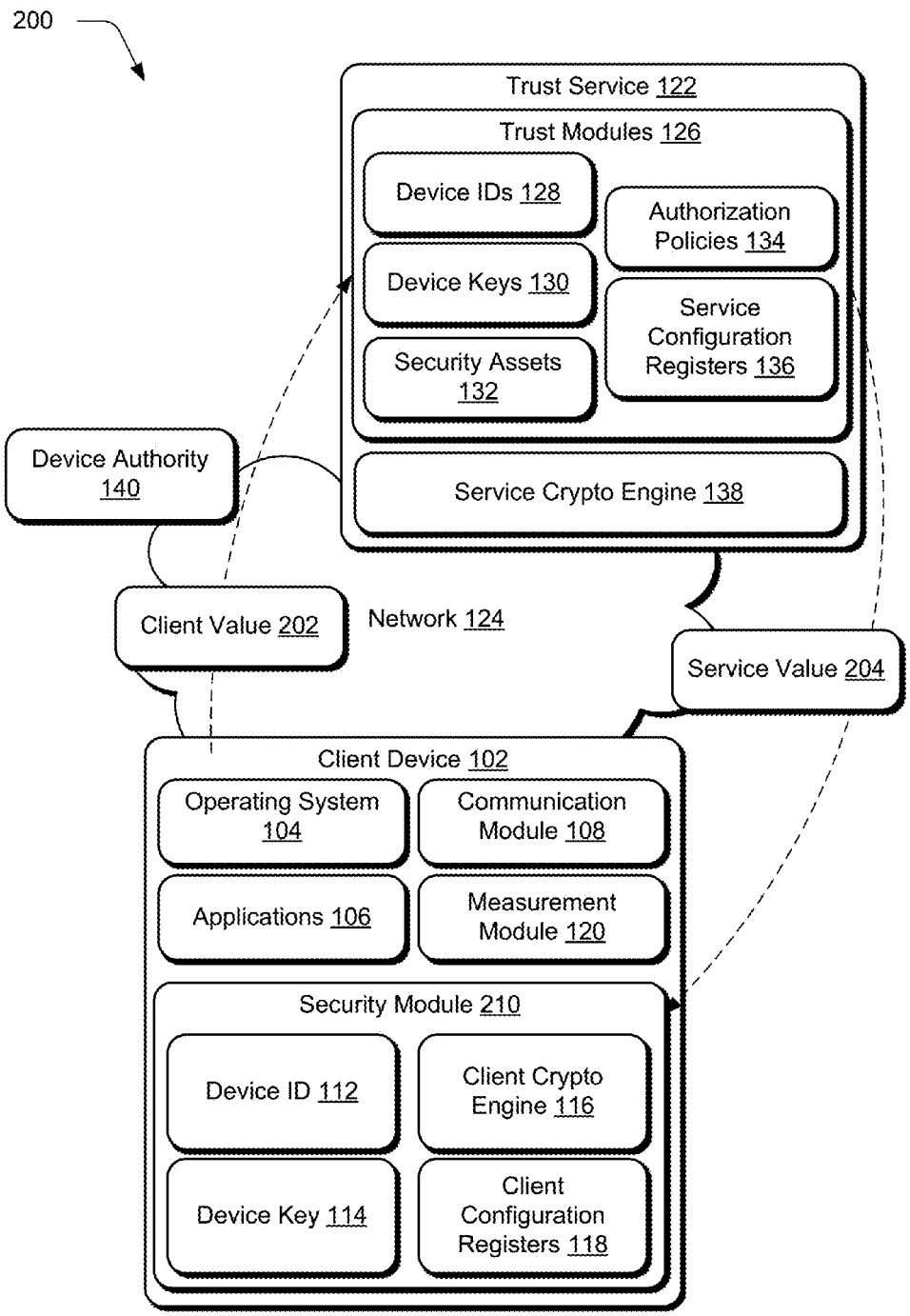
FIG. 2 depicts an example implementation scenario for exchange of a client value and a service value in accordance with one or more embodiments.

FIG. 2 illustrates depicts an example implementation scenario 200 for exchange of a client value and a service value in accordance with one or more implementations. In at least some implementations, the scenario 200 occurs when the client device 102 is initially installed and/or powered-on, such as further to an initial out-of-box experience for the client device 102. The scenario 200, for instance, may represent a first power-on event for the client device 102 after it has left a manufacturing facility.

In the scenario 200, the client device 102 communicates the device ID 112 and a client value 202 to the trust service 122. As referenced above, the device ID 112 may be generated in various ways. For instance, the device ID 112 represents a number value (e.g., an arbitrary value) that is generated by the client crypto engine 116 by applying a cryptographic function to the device key 114 and some form of data, such as to generate an HMAC. For instance, the device ID 112 may be generated as DeviceID=HMAC (DeviceKey, seed value), where seed value can be arbitrarily defined and/or based on known data.

The client value 202 is representative of an arbitrary value that can be used for various purposes, such as for encrypting data sent between the client device 102 and the trust service 122, for tracking state information of the client device 102 (e.g., boot state), and so forth. The client value 202 may be generated in various ways, such as via a random number generator which may generate a nonce value that represents the client value 202.

Further to the scenario 200, the trust service 122 receives the device ID 112 and the client value 202, and uses the device ID 112 to locate the trust module 126 for the client device 102. The trust service 122, for instance, maintains a directory that maps device IDs 128 to respective trust modules 126. Thus, the trust service 122 may perform a directly lookup and/or other query operation using the device ID 112 to match to a corresponding device ID 128 to locate the trust module 126 for the client device 102. Having located the trust module 126, the trust service 122 stores the client value 202 as part of the trust module 126.

The trust service 122 then generates a service value 204 and communicates the service value 204 to the client device 102. Generally, the service value 204 is representative of an arbitrary value that can be used for various purposes, such as for encrypting data sent between the client device 102 and the trust service 122. The service value 204 may be generated in various ways, such as via a random number generator which may generate a nonce value that represents the service value 204.

Continuing with the scenario 200, the security module 110 receives the service value 204 and stores the service value 204 in a protected storage within the security module 110 such that that components external to the security module 110 (e.g., the operating system 104) cannot access the service value 204.

Thus, the client device 102 and the trust service 122 now each have respective copies of the device key 112, the client value 202, and the service value 204. As further detailed below, these elements may be employed to enable the trust service 122 to provide trust-related services to the client device 102.

Having described an example implementation scenario that may employ techniques described herein, consider now a discussion of some example procedures in accordance with one or more embodiments.

Example Procedures

The following section describes some example procedures trust service for a client device in accordance with one or more embodiments. The example procedures may be employed in the environment 100 of FIG. 1, the system 1400 of FIG. 14, and/or any other suitable environment. The procedures, for instance, may be performed by the client device 102, the trust service 122, and/or via interaction between the client device 102 and the trust service 122. In at least some embodiments, steps described for the various procedures are implemented automatically and independent of user interaction.

Figure 3:
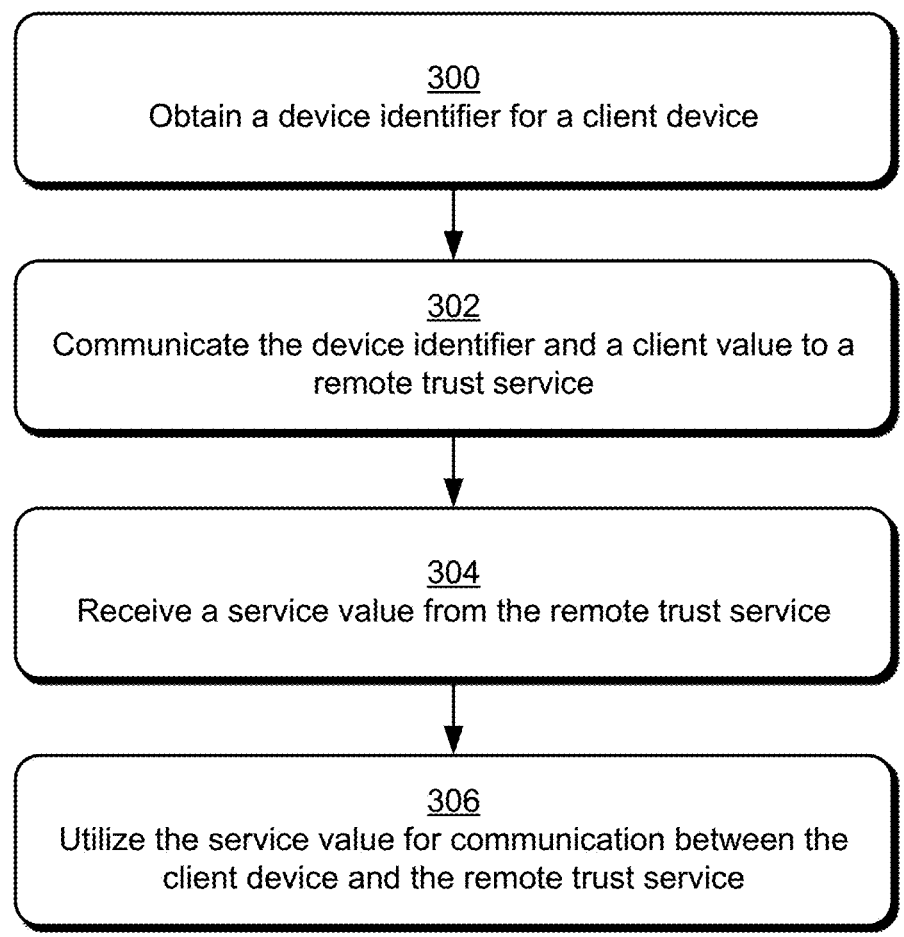
FIG. 3 is a flow diagram that describes steps in a method for exchanging a client value and a service value in accordance with one or more embodiments.

FIG. 3 is a flow diagram that describes steps in a method in accordance with one or more embodiments. The method, for instance, describes an example procedure for exchanging a client value and a service value in accordance with one or more embodiments. In at least some implementations, the method may be performed by the client device 102 when the client device 102 is first powered-on, such as part of an out-of-box experience for the client device 102.

Step 300 obtains a device identifier for a client device. The client device 102, for instance, retrieves the device ID 112 from the security module 110. As referenced above, the device ID 112 may be generated in various ways. For instance, the device ID 112 may be generated by encrypting data using the device key 112. Various types of data may be encrypted with the device key 112 to generate the device ID 112, such as the client value 202, a random nonce value, and/or other data. Alternatively or additionally, the device ID 112 may be generated and stored in the security module 110 when the client device 102 is manufactured. Generally, data used to generate the device ID 112 is protected from being accessed by an entity that is external to the security module 110.

Step 302 communicates the device identifier and a client value to a remote trust service. The client device 102, for example, communicates the device ID 112 and the client value 202 to the trust service 122. In at least some implementations, the device ID 112 and the client value 202 can be encrypted prior to be communicated to the trust service 122. For instance, the security module 110 may employ the client crypto engine 116 to encrypt the device identifier 112 and the client value 202 prior to passing them to the operating system 104 for communication to the trust service 122. Various types of encryption may be employed to encrypt the device ID 112 and the client value 202 prior to communication to the trust service 122. For instance, session-based encryption keys may be utilized by the security module 110 and the trust service 122 for encrypting data communicated between them.

Step 304 receives a service value from the remote trust service. For example, in response to receiving the device ID 112 and the client value 202, the trust service 122 returns the service value 204 to the client device 102, e.g., to the security module 110.

Step 306 utilizes the service value for communication between the client device and the remote trust service. As further detailed herein, the security module 110 may utilize the service value 204 for various purposes, such as for generating command signatures for communicating trust-based commands to the trust service 122.

Figure 4:
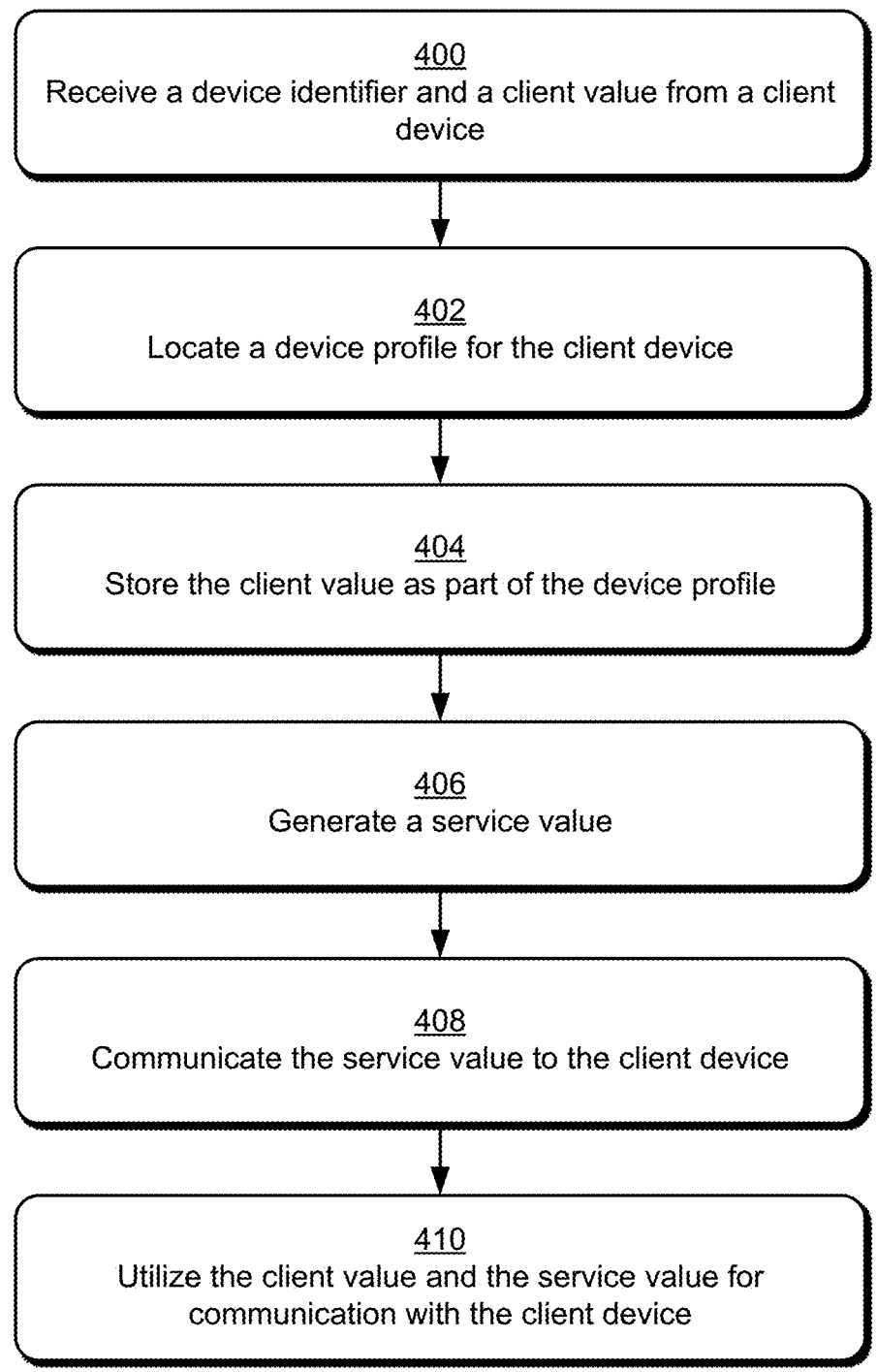
FIG. 4 is a flow diagram that describes steps in a method for returning a service value to a client device in accordance with one or more embodiments.

FIG. 4 is a flow diagram that describes steps in a method in accordance with one or more embodiments. The method, for instance, describes an example procedure for returning a service value to a client device in accordance with one or more embodiments. In at least some implementations, the method may be performed by the trust service 122 when the client device 102 is first powered-on, such as part of an out-of-box experience for the client device 102.

Step 400 receives a device identifier and a client value from a client device. The trust service 122, for example, receives the device ID 112 and the client value 202 from the client device 102. For instance, the device ID 112 and the client value 202 may be received as part of a handshake procedure performed between the client device 102 and the trust service 122 when the client device 102 is first powered on, e.g., as part of an out-of-box experience for the client device 102.

Step 402 locates a device profile for the client device. For instance, the trust service 122 utilizes the device ID 112 to identify a trust module 126 for the client device 102. In at least some implementations, a trust module 126 for the client device 102 is provisioned on the trust service 122 by a device manufacturer, such as by the device authority 140.

Step 404 stores the client value as part of the device profile. The trust service 122, for example, stores the client value 202 as part of the trust module 126. As further detailed herein, the client value 202 can be employed to verify various aspects of communication between the client device 102 and the trust service 122.

Step 406 generates a service value. The trust service 122, for instance, generates the service value 204. As referenced above, the service value 204 can be implemented in various ways, such as a random nonce value.

Step 408 communicates the service value to the client device. For example, the trust service 122 communicates the service value 204 to the client device 102.

Step 410 utilizes the client value and the service value for communication with the client device. As discussed below, the service value 204 may be utilized for various purposes, such as to generate various signatures for communication to the client device 102. The client value 202 may also be utilized for various purposes, such as for signature verification and for verifying boot state of the client device 102.

Figure 5:
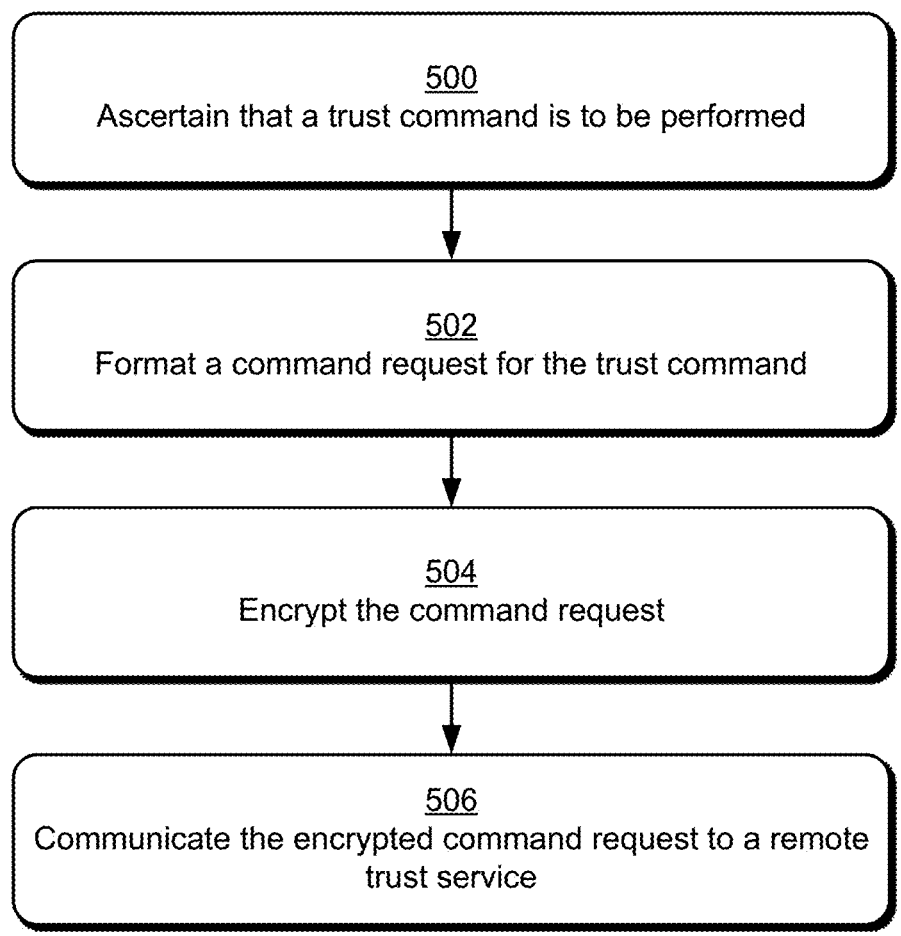
FIG. 5 is a flow diagram that describes steps in a method for communicating a command request in accordance with one or more embodiments.

FIG. 5 is a flow diagram that describes steps in a method in accordance with one or more embodiments. The method, for instance, describes an example procedure for communicating a command request in accordance with one or more embodiments.

Step 500 ascertains that a trust command is to be performed. The client device 102, for instance, ascertains that a trust-based command is to be performed. Examples of a trust command include a request for a security asset 132, a request to encrypt data, a request to decrypt data, and so forth. Generally, a request to perform a trust-based command can be received from various entities, such as the operating system 104, an application 106, and so forth.

Step 502 formats a command request for the trust command. For example, the security module 110 generates a command request using command parameters that describe the trust command. The security module 110 then generates a command signature using the command parameters (e.g., command instructions), the device key 114, the client value 202, and the service value 204. For instance, the command signature may be generated by the client crypto engine 116 as:

CommandSignature=HMAC((DeviceKey∥ClientValue∥ServiceValue), TrustCommand), where ∥ is concatenation.

The command request can then be formatted with the command signature as {TrustCommand, ClientValue, CommandSignature}.

As further detailed below, device state information may be represented in the command request various ways. For instance, device state information may be reflected in the device key (e.g., in the form of measurements), in the device value (e.g., as boot state), and so forth. Thus, in at least some implementations, the command request may reflect device state information that can be used to determine whether a requested trust command is permitted to be performed.

Step 504 encrypts the command request. The command request may be encrypted using any suitable encryption protocol and/or algorithm. For instance, the client crypto engine can encrypt the command request with an encryption key, such as a session-based key that is calculated using the device key QQ. Additionally or alternatively, XOR obfuscation can be applied to obfuscate the command request.

Step 506 communicates the encrypted command request to a remote trust service. The client device 102, for instance, communicates the encrypted command request to the trust service 122.

Figure 6:
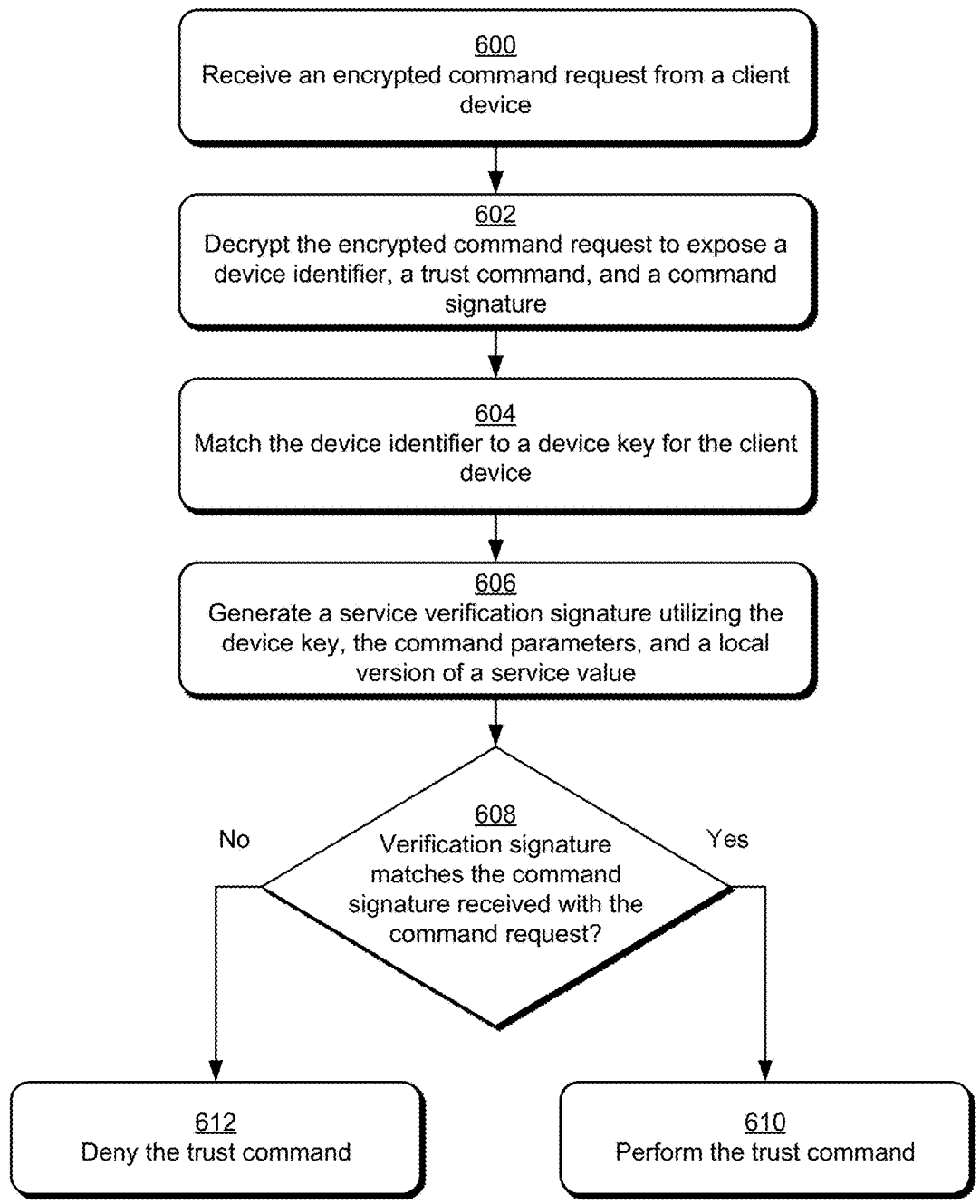
FIG. 6 is a flow diagram that describes steps in a method for ascertaining whether to perform a trust command in accordance with one or more embodiments.

FIG. 6 is a flow diagram that describes steps in a method in accordance with one or more embodiments. The method, for instance, describes an example procedure for ascertaining whether to perform a trust command in accordance with one or more embodiments.

Step 600 receives an encrypted command request from a client device. For instance, the trust service 122 receives an encrypted command request from the client device 102.

Step 602 decrypts the encrypted command request to expose a device identifier, command parameters, and a command signature. According to one or more implementations, the encrypted command request can be decrypted in various ways, such as using a session-based encryption key shared between the client device 102 and the trust service 122. Decrypting the encrypted command request, for example, reveals the device ID 112 along with command parameters such as a trust command and the client value 202.

Step 604 matches the device identifier to a device key for the client device. The trust service 122, for instance, utilizes the device ID 112 to identify a trust module 126 that is bound to the client device 102. The trust service 122 then retrieves the device key 130 from the trust module 126.

Step 606 generates a service verification signature utilizing the device key, the command parameters, and a local version of a service value. The trust service 122, for instance, calculates a verification signature using the device key 130 for the client device 102, the service value 204 stored as part of the trust module 126, and command parameters received as part of the command request, e.g., trust command parameters and the client value 202. For example, the service verification signature may be generated as:

VerificationSignatureS=HMAC((DeviceKeyS‖ClientValue‖ServiceValueS), TrustCommand), where DeviceKeyS and ServiceValueS are retrieved locally (e.g., from the trust module 126), and ClientValue and TrustCommand are received as part of the command request.

Step 608 ascertains whether the verification signature matches the command signature received with the command request. The trust service 122, for instance, compares the verification signature to the received command signature.

If the verification signature matches the command signature ("Yes"), step 610 performs the trust command. The trust command can be implemented in various ways. For instance, the trust command may include a request to decrypt encrypted data included with the command request. The security assets 132, for example, may include a cryptographic key that can be used to decrypt encrypted data. As another example, the command request may include a request to encrypt data included with the command request. The security assets 132, for example, may include a cryptographic key that can be used to encrypt data. As yet another example, the command request may include a request for a security asset 132, such as a cryptographic key and/or other protected data.

If the verification signature does not match the command signature ("No"), step 612 denies the trust command. For instance, access to the trust module 126 for the client device 102 is denied. In at least some implementations, the trust service 122 communicates a notification to the client device 102 that the trust command is denied.

Various reasons may cause the verification signature to not match the command signature. For instance, if an invalid device key and/or service value is used to generate the command signature, the signatures will not match. In at least some implementations, a failure in signature matching may indicate an attempt to gain unauthorized access to a trust module 126 for the client device 102. Alternatively or additionally, a failure in signature matching may indicate that the client device 102 is in an untrusted state, e.g., that a code component of the client device 102 (e.g., of the operating system 104) has been altered and thus is in an untrusted state such that access to the trust module 126 is denied.

Figure 7:
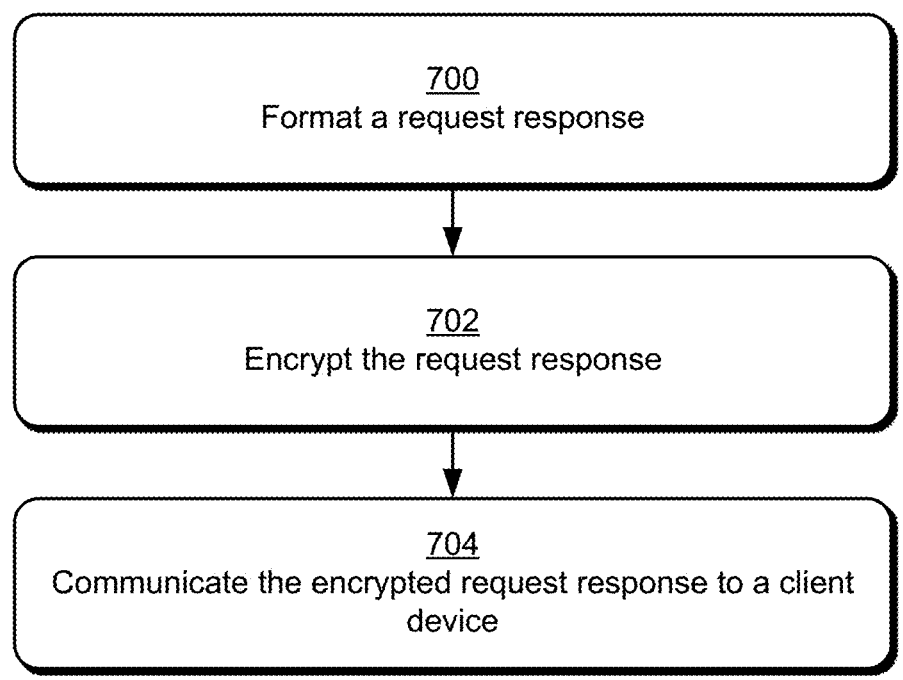
FIG. 7 is a flow diagram that describes steps in a method for communicating a request response in accordance with one or more embodiments.

FIG. 7 is a flow diagram that describes steps in a method in accordance with one or more embodiments. The method, for instance, describes an example procedure for communicating a request response in accordance with one or more embodiments. In at least some implementations, the method describes an example extension of the method discussed above with reference to FIG. 6.

Step 700 formats a request response. For example, the trust service 122 generates a request response that includes a result of performing a trust command, such as decrypted data, encrypted data, a security asset, and so forth. The trust service 122 then generates a response signature using the command results, the device key QQ, the device value QQ, and the service value 204. For instance, the command signature may be generated by the service crypto engine 138 as:

ReponseSignature=HMAC((DeviceKey‖ClientValue‖Service Value), CommandResult)

The request response can then be formatted with the command signature as {CommandResult, Service Value, ResponseSignature}

Step 702 encrypts the request response. The request response may be encrypted using any suitable encryption protocol and/or algorithm. For instance, the service crypto engine 138 can encrypt the request response with an encryption key, such as a session-based key that is calculated using the device key QQ. Additionally or alternatively, XOR obfuscation can be applied to obfuscate the command request.

Step 704 communicates the encrypted request response to a client device. The trust service 122, for instance, communicates the encrypted request response to the client device 102.

Figure 8:
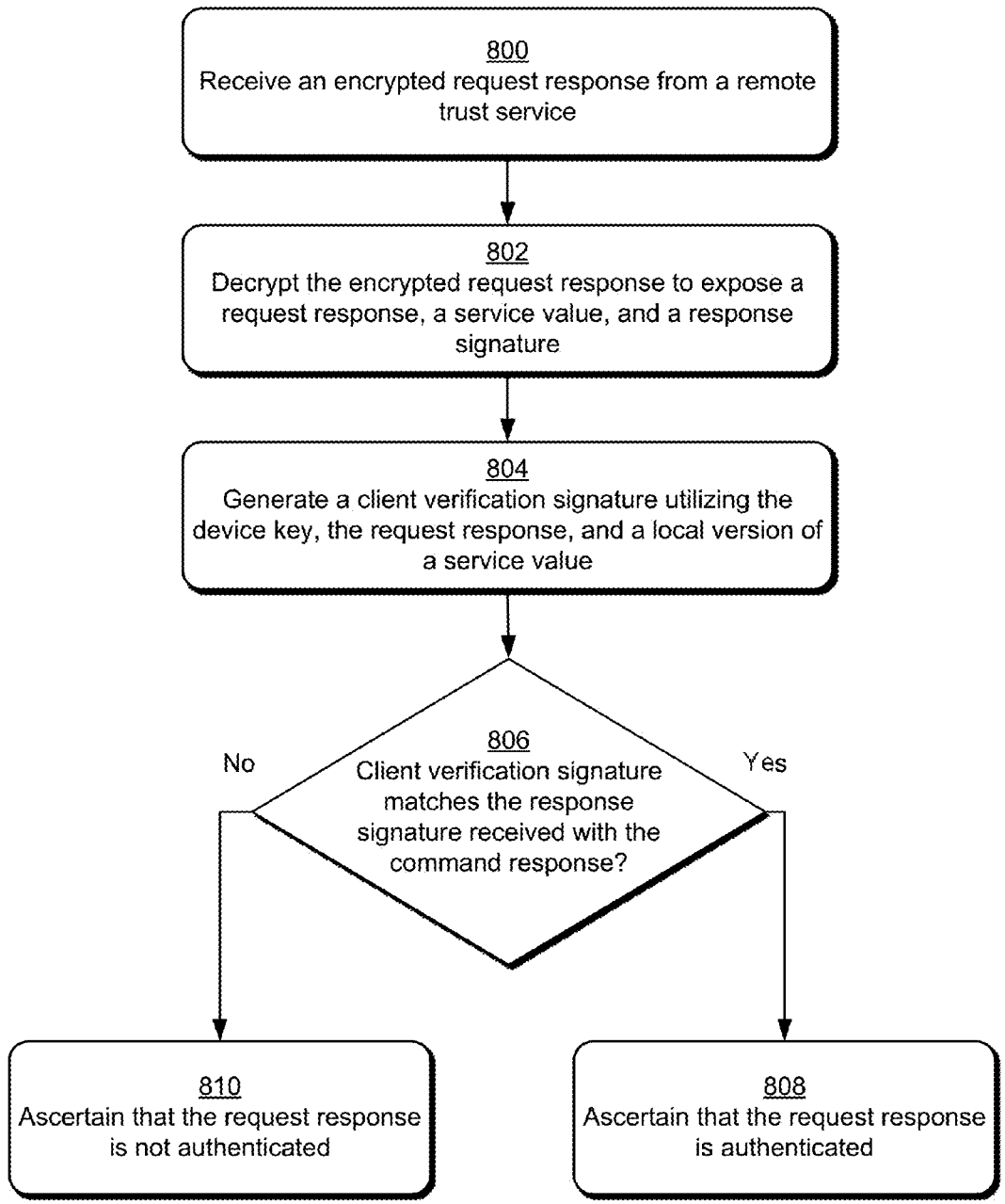
FIG. 8 is a flow diagram that describes steps in a method for authenticating a request response in accordance with one or more embodiments.

FIG. 8 is a flow diagram that describes steps in a method in accordance with one or more embodiments. The method, for instance, describes an example procedure for authenticating a request response in accordance with one or more embodiments.

Step 800 receives an encrypted request response from a remote trust service. The client device 102, for instance, receives an encrypted request response from the trust service 122 that is generated in response to a command request from the client device 102. Example attributes of a command request and a request response are discussed above.

Step 802 decrypts the encrypted request response to expose a request response, a service value, and a response signature. The client crypto engine 116, for instance, decrypts the request response to reveal a request response, a service value, and a request signature. As referenced above, the request response may include a result of performing a trust command, examples of which are provided above.

Step 804 generates a client verification signature utilizing the device key, the request response, and a local version of a service value. The trust module 126, for instance, calculates a verification signature using the device key QQ and the service value 204 that are maintained locally on the trust module 126, and a command response received as part of the request response. For example, the client verification signature may be generated as:

VerifSignatureC=HMAC((DeviceKeyC‖ClientValueC‖ServiceValueC), CommandResponse), where DeviceKeyC, ClientValueC, and ServiceValueC are retrieved locally (e.g., from the security module 110), and CommandResponse is received as part of the command response.

Step 806 ascertains whether the client verification signature matches the response signature received with the command response. The security module 110, for instance, compares the client verification signature to the received response signature.

If the client verification signature matches the response signature ("Yes"), step 808 ascertains that the request response is authenticated. The security module 110, for instance, ascertains that the request response is authenticated and thus can be trusted. For example, the security module 110 determines that data includes in the request response (e.g., a result of performing a trust command) can be trusted.

If the client verification signature does not match the response signature "No"), step 810 ascertains that the request response is not authenticated. The security module 110, for instance, ascertains that the request response is not authenticated and thus cannot be trusted. For example, the security module 110 determines that data included in the request response (e.g., a putative result of performing a trust command) is untrusted. In at least some implementations, a request response that fails authentication is discarded.

Figure 9:
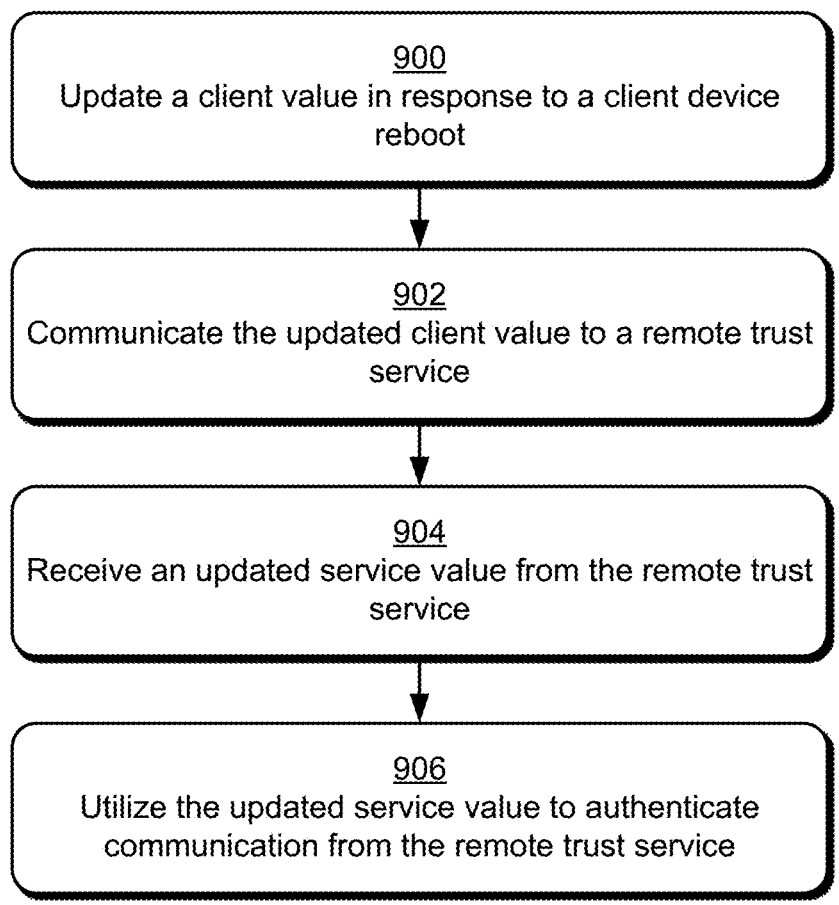
FIG. 9 is a flow diagram that describes steps in a method for updating a service value in accordance with one or more embodiments.

FIG. 9 is a flow diagram that describes steps in a method in accordance with one or more embodiments. The method, for instance, describes an example procedure for updating a service value in accordance with one or more embodiments.

Step 900 updates a client value in response to a client device reboot. The client device 102, for instance, recalculates the client value 202 in response to a reboot of the client device 102. Generally, the recalculated client value 202 replaces a previous version of the client value.

In at least some implementations, the device reboot may occur when the client device 102 is powered off and then powered on again. Alternatively or additionally, the device reboot may occur when the client device 102 crashes (e.g., the operating system 104) and subsequently restarts. Generally, the device reboot causes the client device 102 to transition from a previous boot state to a new boot state.

Step 902 communicates the updated client value to a remote trust service. For example, the client device 102 communicates the updated client value to the trust service 122. In at least some implementations, the updated client value is communicated as part of a command request. For instance, the updated client value can be used for the ClientValue variable used to calculate a command signature and a command request, such as discussed above with reference to FIG. 5. As discussed below, the updated client value may be used to indicate that a client device has rebooted into a new boot state.

Step 904 receives an updated service value from the remote trust service. The client device 102, for instance, receives an updated version of the service value 204 from the trust service 122. As detailed below, the trust service 122 may generate the updated service value in response to receiving the updated client value.

Step 906 utilizes the updated service value to authenticate communication from the remote trust service. For example, the client device 102 utilizes the updated service value to authenticate trust-related communication from the trust service 122. The updated service value, for instance, may be utilized as the ServiceValueC variable discussed above with reference to FIG. 8. In at least some implementations, the updated service value may be utilized to replace a previous, different version of a service value.

Figure 10:
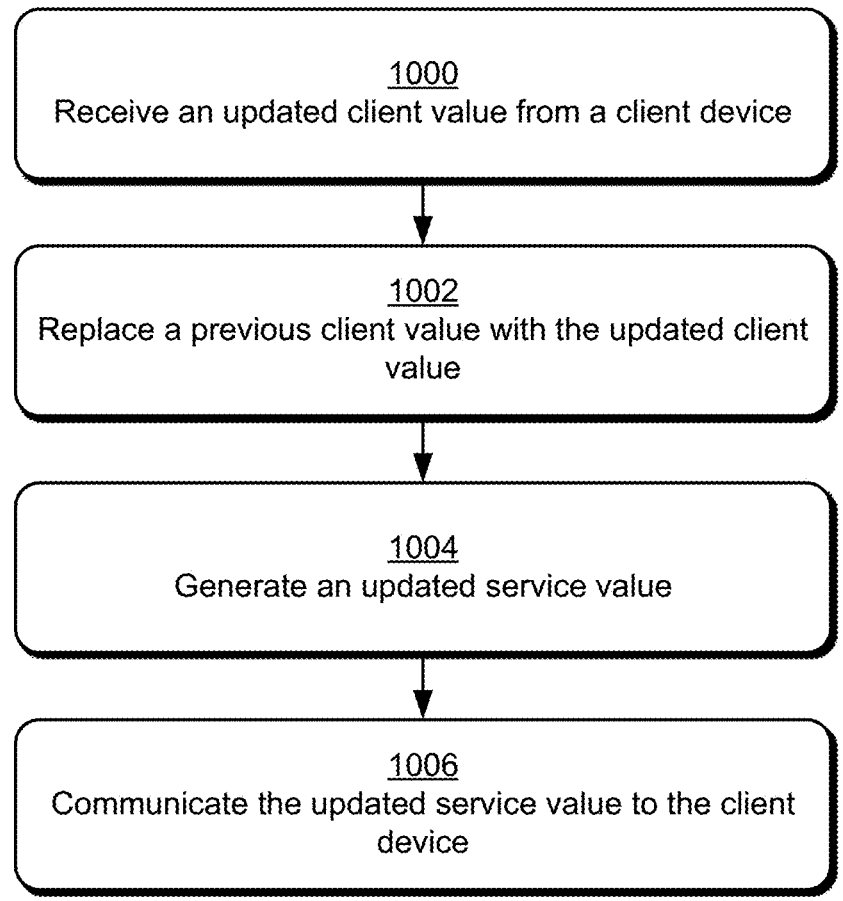
FIG. 10 is a flow diagram that describes steps in a method for communicating an updated service value in accordance with one or more embodiments.

FIG. 10 is a flow diagram that describes steps in a method in accordance with one or more embodiments. The method, for instance, describes an example procedure for communicating an updated service value in accordance with one or more embodiments.

Step 1000 receives an updated client value from a client device. The trust service 122, for instance, receives an updated client value 202 from the client device 102. As discussed above, the updated client value may be generated and communicated in response to a device reboot. In response to receiving the updated client value, the trust service 122 may ascertain that a reboot event has occurred and that the client device 102 is in a new boot state.

The updated client value may be received in various ways. For instance, the updated client value may be received as part of a command request, such as the ClientValue variable discussed above with reference to FIG. 5.

Step 1002 replaces a previous client value with the updated client value. For example, the trust service 122 replaces a current client value in the trust module 126 with the updated client value.

Step 1004 generates an updated service value. The trust service 122, for instance, generates an updated service value that is different than the current service value 204. For example, the updated service value 204 is generated in response to ascertaining that the updated client value is received.

Step 1006 communicates the updated service value to the client device. For example, the trust service 122 communicates the updated service value to the client device 102. As referenced above, the updated service value may be utilized by the client device 102 to authenticate communication from the trust service 122.

Figure 11:
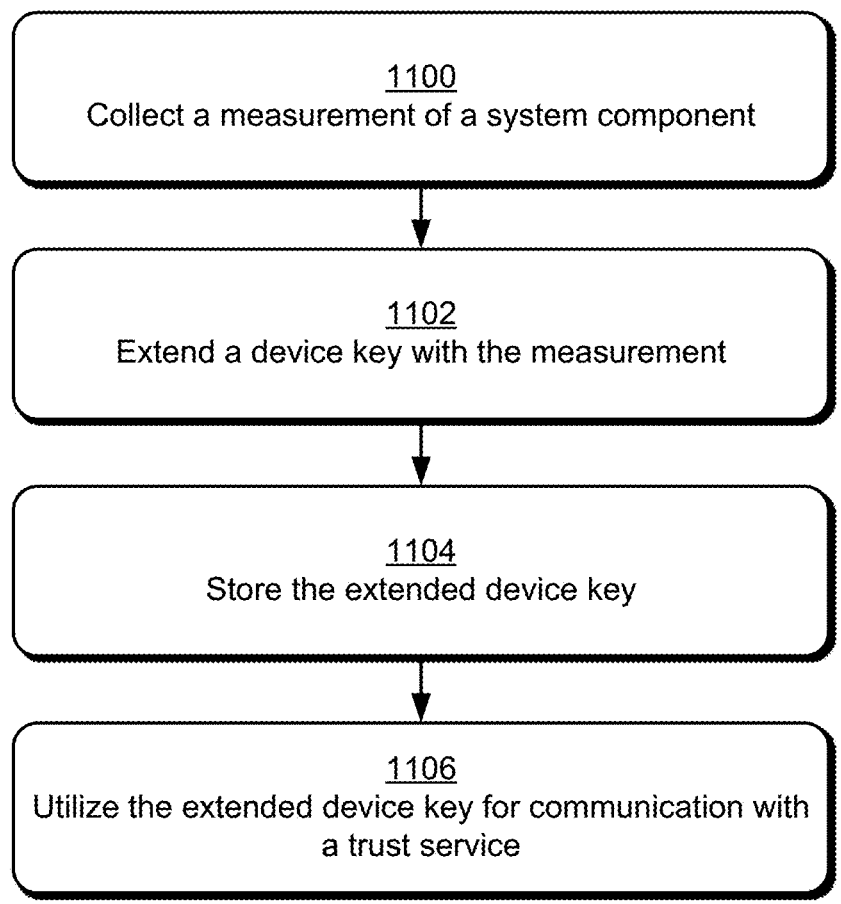
FIG. 11 is a flow diagram that describes steps in a method for utilizing a measurement to extend a device key in accordance with one or more embodiments.

FIG. 11 is a flow diagram that describes steps in a method in accordance with one or more embodiments. The method, for instance, describes an example procedure for utilizing a measurement to extend a device key in accordance with one or more embodiments. In at least some implementations, the method may be performed while a system boot process is being performed. The method, for instance, may be performed each time a system is booted to generate boot state information.

Step 1100 collects a measurement of a system component. The client device 102, for instance, generates a measurement of system code, such as a component of the operating system 104. Example ways of generating a measurement are discussed above, and may generally include generating a hash value of a code component.

In at least some implementations, a measurement of a system component is collected in response to a system boot event. For instance, when the client device 102 initially boots (e.g., as part of an out-of-box experience), or a reboot event occurs, a measurement of a system component is captured. While a single measurement is discussed for purpose of example, it is to be appreciated that measurements of multiple different system components may be captured.

Step 1102 extends a device key with the measurement. The security module 110, for instance, extends the device key QQ with the measurement. Generally, extension of the device key QQ with a measurement can be performed as $ClientDeviceKey_{n+1} = HMAC(ClientDeviceKey_n, ClientMeasurement_{n+1})$, where ClientDeviceKey is a version of the device key maintained locally on a client device (e.g., by the security module 110), and ClientMeasurement is a measurement of a code component captured on the client device.

As referenced above, a device ID (e.g., the device ID 112) may be generated based on the device key 114. Thus, prior to appending the device key 114 with a measurement, the device ID 112 may be calculated as a function of the device key 114 prior to being extended with the measurement. Once the device ID 112 is calculated, the device key 114 may be extended with one or more measurements. For instance, when measurements for multiple different components are captured, the device key 114 would be extended as:

$ClientDeviceKey_1 = HMAC(ClientDeviceKey_0, ClientMeasurement_1)$, $ClientDeviceKey_2 = HMAC(ClientDeviceKey_1, ClientMeasurement_2)$,

:

$ClientDeviceKey_{n+1} = HMAC(ClientDeviceKey_n, ClientMeasurement_{n+1})$

Step 1104 stores the extended device key. The security module 110, for instance, stores the extended device key as part of the client configuration registers 118. In at least some implementations, the extended device key is stored before the measured component is operational, e.g., while the client device 102 is still in a boot process. Thus, a measured component may be prevented from tampering with its measurement and avoiding detection.

Step 1106 utilizes the extended device key for communication with a trust service. The security module 110, for instance, utilizes the resulting ClientDeviceKey$_{n+1}$ for communication of a command request, such as for the DeviceKey variable used to generate the CommandSignature as discussed with reference to FIG. 5.

According to various implementations, this method may be performed each time a system (e.g., the client device 102) is booted. Thus, measurements may be collected and used to extend a device key to verify device state in response to a system boot event.

Figure 12:
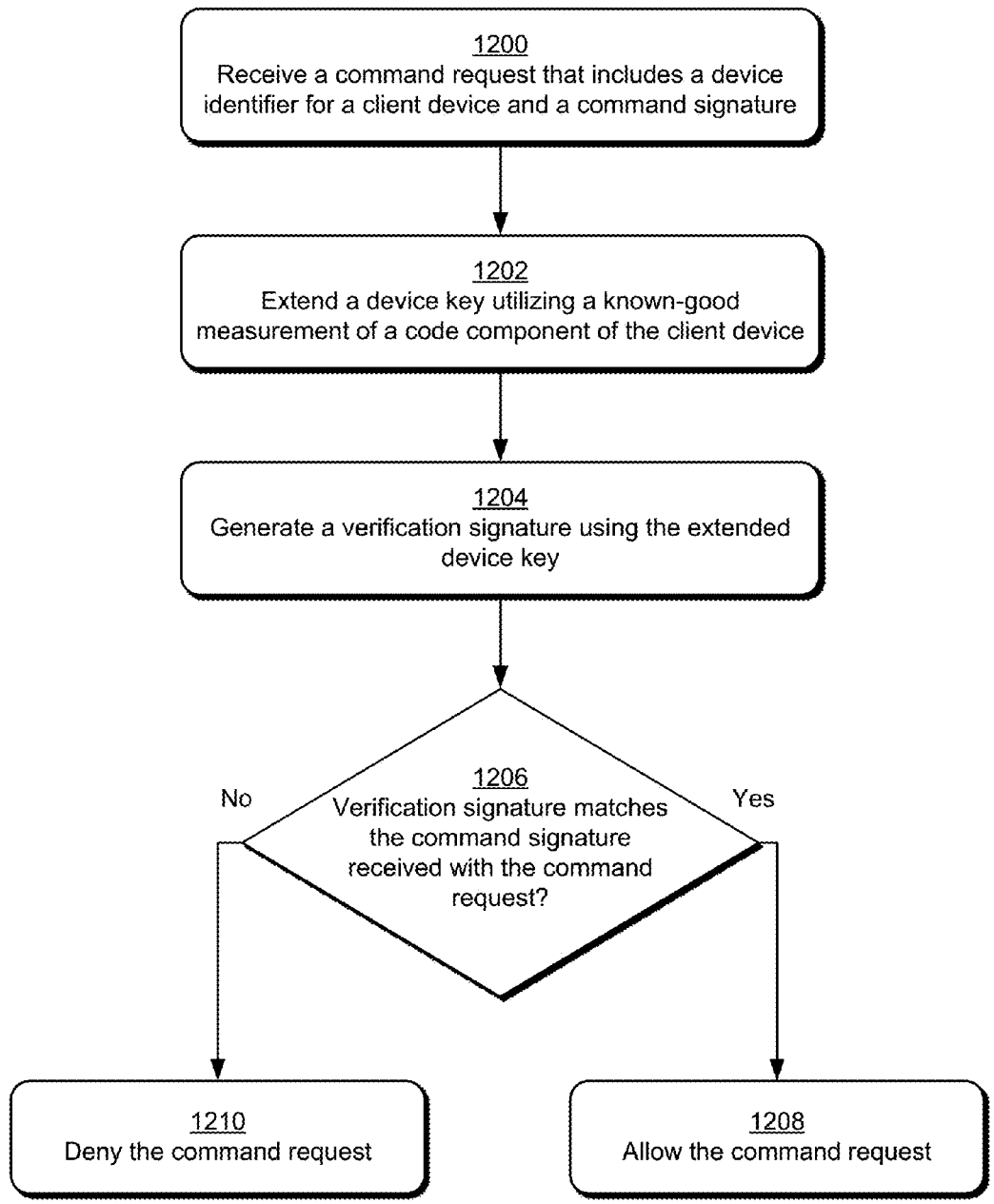
FIG. 12 is a flow diagram that describes steps in a method for utilizing a known-good measurement to verify device state in accordance with one or more embodiments.

FIG. 12 is a flow diagram that describes steps in a method in accordance with one or more embodiments. The method, for instance, describes an example procedure for utilizing a known-good measurement to verify device state in accordance with one or more embodiments. In at least some implementations, the method describes an example variation of the method described with reference to FIG. 6.

Step 1200 receives a command request that includes a device identifier for a client device and a command signature. Examples if a device identifier and a command signature are described above.

Step 1202 extends a device key utilizing a known-good measurement of a code component of the client device. The trust service 122, for instance, retrieves the known-good measurement from the service configuration registers 136. The trust service 122 then extends the device key 130 for the client device 102 (e.g., a local version of the device key 114) with the known-good measurement. Generally, extension of the device key 130 with a known-good measurement can be performed as ServiceDeviceKey$_{n+1}$=HMAC(ServiceDeviceKey$_n$, ServiceMeasurement$_{n+1}$), where ServiceDeviceKey is a version of the device key maintained locally on a trust service (e.g., as part of the trust module 126 for the client device 102), and ServiceMeasurement is a known-good measurement of a code component maintained by the trust service 122, such as in the service configuration registers 136.

As referenced above, measurements for multiple different code components may be captured and used to generate a device key. Thus, when signature verification is to be performed based on multiple measurements, the device key QQ would be extended using multiple known-good measurements as:

ServiceDeviceKey$_1$=HMAC(ServiceDeviceKey$_0$, ServiceMeasurement$_1$),

ServiceDeviceKey$_2$=HMAC(ServiceDeviceKey$_1$, ServiceMeasurement$_2$),

:

ServiceDeviceKey$_{n+1}$=HMAC(ServiceDeviceKey$_n$, ServiceMeasurement$_{n+1}$)

Step 1204 generates a verification signature using the extended device key. The trust service 122, for example, utilizes the extended device key as the DeviceKeyS variable for generating the VerificationSignatureS discussed with reference to FIG. 6.

Step 1206 ascertains whether the verification signature matches the command signature received with the command request. If the command signature matches the command signature ("Yes"), step 1208 allows the command request. As discussed above, an allowed command request may include causing a trust command to be performed, and results of the trust command to be communicated to a requesting entity.

In at least some implementations, if the verification signature matches the command signature, this means that a measurement used to generate the command signature (e.g., for generating the ClientDeviceKey$_{n+1}$ referenced above) matches a known-good measurement and thus a measured component is likely in a known-good state.

If the command signature does not match the command signature ("No"), step 1210 denies the command request. As discussed above, a denied command request may include notifying a requesting entity that a trust command is disallowed.

In at least some implementations, if the verification signature does not match the command signature, this means that a measurement used to generate the command signature (e.g., for generating the ClientDeviceKey$_{n+1}$ referenced above) does not match a known-good measurement and thus a measured component is likely not in a known-good state. A failure of a measurement to match a known-good measurement may occur for various reasons, such as component tampering (e.g., by malware), component corruption (e.g., a code error), and so forth.

Thus, this method provides an example procedure for utilizing a device key as a mechanism for verifying device state.

Figure 13:
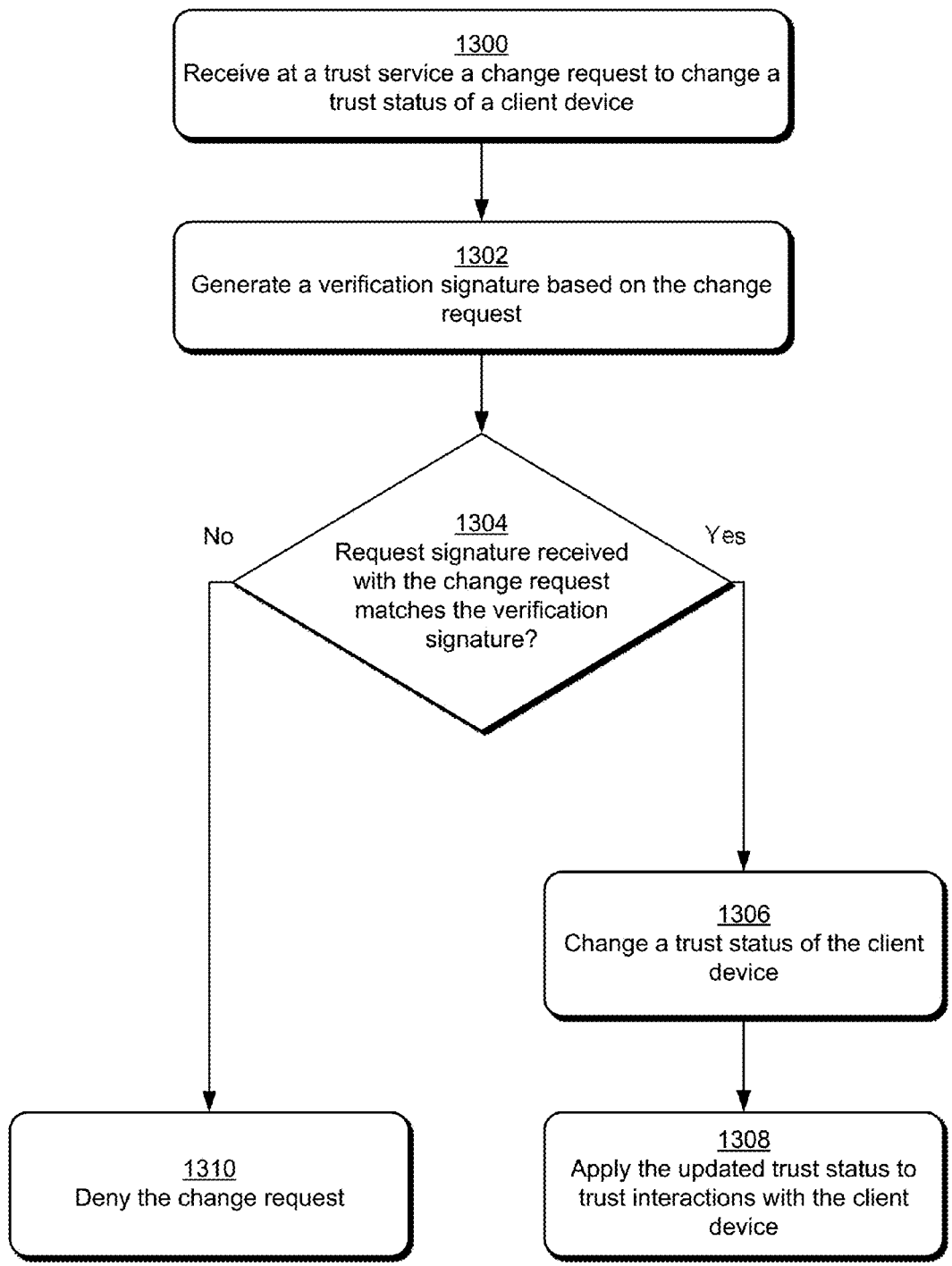
FIG. 13 is a flow diagram that describes steps in a method for changing various trust information of a client device in accordance with one or more embodiments.

FIG. 13 is a flow diagram that describes steps in a method in accordance with one or more embodiments. The method, for instance, describes an example procedure for changing various trust information of a client device in accordance with one or more embodiments.

Step 1300 receives at a trust service a change request to change a trust status of a client device. The trust service 122, for instance, receives a request from the device authority 140 to change a trust status of the client device 102.

Step 1302 generates a verification signature based on the change request. The change request, for instance, includes the device ID 112 for the client device 102. Thus, the trust service 122 retrieves the device key 130 for the client device 102, and generates a verification signature using the device key 130 as applied to attributes of the change request. Example ways of generating a verification signature are discussed above, and may include applying an HMAC function using a device key along with other data.

Step 1304 ascertains whether a request signature received with the change request matches the verification signature. For example, the trust service 122 compares the verification signature to the request signature received with the change request.

If the request signature matches the verification signature ("Yes"), step 1306 changes a trust status of the client device. According to various implementations, a signature match indicates that a correct device key was used to generate the request signature. Accordingly, the trust service 122 updates a trust status of the client device 102, such as by making a change to the trust module 126.

Generally, an update to a trust status can include various actions. For instance, the change request may include a change to the security assets 132, such as a new security asset to be added, an indication of a security asset to be removed (e.g., revoked), a modification to an existing security asset, and so forth. As another example, an update to a trust status may include a change to device permissions, such as a change in actions (e.g., trust-based operations) that the client device 102 is permitted access to. In yet another example, an update to a trust status may indicate that the client device is no longer allowed to access and/or interact with its trust module 126. For instance, the device authority 140 may receive an indication that the client device 102 is stolen and/or compromised, and thus may communicate a change request to the trust service 122 to cause a trusted status of the client device 102 to be revoked to prevent the client device 102 from interacting with its trust module 126.

Step 1308 applies the updated trust status to trust interactions with the client device. For instance, the trust service 122 allows the client device 102 to interact with the trust module 126 based on the applied change request, such as based on updated security assets 132, updated permissions and/or privileges, and so forth.

If the request signature does not match the request signature ("No"), step 1310 denies the change request. The trust service 122, for instance, disallows an action requested by the change request, such as by disallowing a change to the trust module 126. In at least some implementations, the trust service 122 can communicate a notification to a requesting entity (e.g., the device authority 140) that the change request is denied.

According to one or more implementations, various aspects of this method can be performed independent of interaction with the client device 102. For instance, steps 1300, 1302, 1306, and 1310 can be performed independent of interaction with the client device 102, such as via interaction between the device authority 140 and the trust service 122. Thus, a trust status of the client device 102 can be updated without interaction with the client device 102. In at least some implementations, this enables a trust status of the client device 102 to be updated while the client device 102 is inaccessible, such as when the client device 102 is powered off, is not connected to a network, is non-responsive (e.g., crashed), and so forth.

Having discussed some example procedures trust service for a client device, consider now a discussion of an example system and device in accordance with one or more embodiments.

Example System and Device

Figure 14:
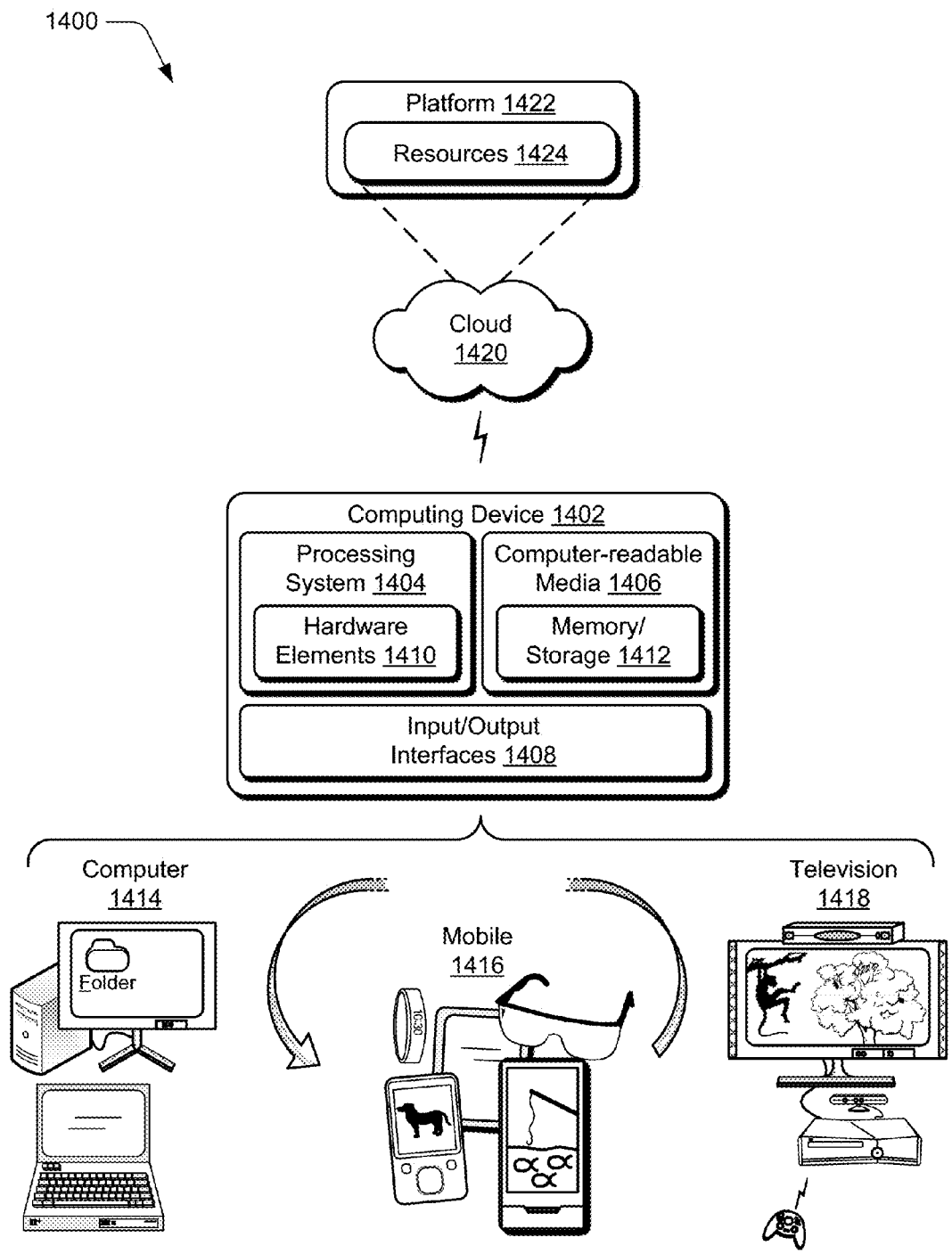
FIG. 14 illustrates an example system and computing device as described with reference to FIG. 1, which are configured to implement embodiments of techniques described herein.

FIG. 14 illustrates an example system generally at 1400 that includes an example computing device 1402 that is representative of one or more computing systems and/or devices that may implement various techniques described herein. For example, the client device 102 discussed above with reference to FIG. 1 can be embodied as the computing device 1402. The computing device 1402 may be, for example, a server of a service provider, a device associated with the client (e.g., a client device), an on-chip system, and/or any other suitable computing device or computing system.

The example computing device 1402 as illustrated includes a processing system 1404, one or more computer-readable media 1406, and one or more Input/Output (I/O) Interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1406 is illustrated as including memory/storage 1412. The memory/storage 1412 represents memory/storage capacity associated with one or more computer-readable media. The memory/storage 1412 may include volatile media (such as random access memory (RAM)) and/or nonvolatile media (such as read only memory (ROM), Flash memory, optical disks, magnetic disks, and so forth). The memory/storage 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1410 and computer-readable media 1406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of modules that are executable by the computing device 1402 as software may be achieved at least partially in hardware, e.g., through use of computer-readable storage media and/or hardware elements 1410 of the processing system. The instructions and/or functions may be executable/operable by one or more articles of manufacture (for example, one or more computing devices 1402 and/or processing systems 1404) to implement techniques, modules, and examples described herein.

As further illustrated in FIG. 14, the example system 1400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1402 may assume a variety of different configurations, such as for computer 1414, mobile 1416, and television 1418 uses. Each of these configurations includes devices that may have generally different constructs and capabilities, and thus the computing device 1402 may be configured according to one or more of the different device classes. For instance, the computing device 1402 may be implemented as the computer 1414 class of a device that includes a personal computer, desktop computer, a multi-screen computer, laptop computer, netbook, and so on.

The computing device 1402 may also be implemented as the mobile 1416 class of device that includes mobile devices, such as a mobile phone, portable music player, portable gaming device, a tablet computer, a wearable device, a multi-screen computer, and so on. The computing device 1402 may also be implemented as the television 1418 class of device that includes devices having or connected to generally larger screens in casual viewing environments. These devices include televisions, set-top boxes, gaming consoles, and so on.

The techniques described herein may be supported by these various configurations of the computing device 1402 and are not limited to the specific examples of the techniques described herein. For example, functionalities discussed with reference to the client device 102 and/or the trust service 122 may be implemented all or in part through use of a distributed system, such as over a "cloud" 1420 via a platform 1422 as described below.

The cloud 1420 includes and/or is representative of a platform 1422 for resources 1424. The platform 1422 abstracts underlying functionality of hardware (e.g., servers) and software resources of the cloud 1420. The resources 1424 may include applications and/or data that can be utilized while computer processing is executed on servers that are remote from the computing device 1402. Resources 1424 can also include services provided over the Internet and/or through a subscriber network, such as a cellular or Wi-Fi network.

The platform 1422 may abstract resources and functions to connect the computing device 1402 with other computing devices. The platform 1422 may also serve to abstract scaling of resources to provide a corresponding level of scale to encountered demand for the resources 1424 that are implemented via the platform 1422. Accordingly, in an interconnected device embodiment, implementation of functionality described herein may be distributed throughout the system 1400. For example, the functionality may be implemented in part on the computing device 1402 as well as via the platform 1422 that abstracts the functionality of the cloud 1420.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include a system comprising: one or more processors; and one or more computer-readable storage media storing computer-executable instructions that, responsive to execution by the one or more processors, cause the system to perform operations including: ascertaining that a trust command is to be performed for a client device; formatting a command request for the trust command, including generating a command signature based at least on a device key for the client device, a device value, and command parameters for the trust command, at least one of the device key or the device value reflecting state information for the client device; communicating the command request for receipt by a remote trust service; and receiving a response to the command request that indicates whether the command request is allowed.

Implementations discussed herein include a system as described above, wherein the trust command includes at least one of a request to encrypt data included with the command parameters, a request to decrypt data included with the command parameters, or a request for access to a security asset.

Implementations discussed herein include a system as described above, wherein the device value reflects a boot state of the client device.

Implementations discussed herein include a system as described above, wherein said formatting further comprises extending the device key with a measurement of a code component of the client device prior to generating the command signature.

Implementations discussed herein include a system as described above, wherein the operations are performed in a trust environment on the client device that is inaccessible to an operating system of the client device.

Implementations discussed herein include a system as described above, wherein the operations are performed in a trust environment on the client device that is inaccessible to an operating system of the client device, and wherein the operating system requests the trust command.

Implementations discussed herein include a system as described above, wherein said ascertaining occurs subsequent to a reboot event of the client device, and wherein said device value comprises an updated device value that is generated in response to the reboot event.

Implementations discussed herein include a system as described above, wherein the operations further include: receiving a request response to the command request from the remote trust service; generating a verification signature utilizing the device key, the request response, and a service value maintained for the remote trust service; and ascertaining whether the request response is authenticated based on whether the verification signature matches a response signature received with the request response.

Implementations discussed herein include a computer-implemented method, comprising: receiving an encrypted command request from a client device; decrypting the encrypted command request to expose a device identifier for the client device, command parameters, and a command signature, the command parameters requesting interaction with a security environment that is remote from the client device; generating a verification signature utilizing a device key associated with the device identifier and the command parameters; ascertaining whether to allow the command request based on whether the verification signature matches the command signature received with the command request; and communicating a response to the command request for receipt by the client device, the response indicating whether the command request is allowed.

Implementations discussed herein include a computer-implemented method as described above, wherein the command parameters include at least one of a request to encrypt data, a request to decrypt data, or a request for access to a security asset.

Implementations discussed herein include a computer-implemented method as described above, wherein said generating further comprises utilizing a client value to generate the verification signature, the client value indicating a boot state of the client device.

Implementations discussed herein include a computer-implemented method as described above, further comprising, prior to said generating, extending the device key with a known good measurement of a code component of the client device to generate an extended device key for usage in said generating Implementations discussed herein include a computer-implemented method as described above, further comprising: performing the command request in response to ascertaining that the verification signature matches the command signature; and including results of said performing in the command request.

Implementations discussed herein include a computer-implemented method as described above, wherein said decrypting further exposes an updated client value for the client device, and the operations further comprise: replacing a previous client value with the updated client value; generating an updated service value; and communicating the updated service value to the client device for use in formatting a command request.

Implementations discussed herein include a computer-implemented method as described above, further comprising: receiving a request to change a trust status of the client device; generating a verification signature based on the change request; and changing the trust status of the client device responsive to ascertaining that a request signature received with the change request matches the verification signature, said changing occurring independent of interaction with the client device.

Implementations discussed herein include a computer-implemented method as described above, further comprising: receiving a request from a device authority to change a trust status of the client device; and changing the trust status of the client device via interaction with the device authority and independent of interaction with the client device.

Implementations discussed herein include a computer-implemented method as described above, further comprising changing a trust status of the client device via interaction with a device authority and independent of interaction with the client device, said changing including at least one of provisioning a new security asset for the client device, or revoking an existing security asset of the client device.

Implementations discussed herein include a system comprising: one or more processors; and one or more computer-readable storage media storing computer-executable instructions that, responsive to execution by the one or more processors, cause the system to perform operations including: maintaining, at a trust service that is remote from a client device, a trust module for the client device that stores a device key for the client device, an indicator of a boot state of the client device, and one or more security assets for the client device; receiving a request from the client device to perform a trust command received as part of a command request; and ascertaining whether to allow the command request based on whether a verification signature generated using the device key and the indicator of the boot state matches a request signature received with the command request.

Implementations discussed herein include a system as recited above, wherein the one or more security assets comprise one or more of a security key, a security certificate, or protected data stored within the trusted platform module.

Implementations discussed herein include a system as recited above, wherein the operations further include maintaining a known good measurement of a code component of the client device as part of the trust module, and utilizing the known good measurement to extend the device key prior to generating the verification signature.

Conclusion

Techniques trust service for a client device are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
   receiving, at a server, an encrypted command request from a client device;
   decrypting, at the server, the encrypted command request to expose a device identifier corresponding to the client device, command parameters, and a command signature generated by the client device based on a client device key stored at the client device and the command parameters, the command parameters requesting interaction with a security environment that is remote from the client device;
   generating, at the server, a verification signature utilizing (i) a server device key corresponding to the exposed device identifier and stored at the server and (ii) the exposed command parameters in the received command request;
   ascertaining, at the server, whether to allow the command request from the client device based on a comparison of the verification signature and the command signature in the received command request; and
   communicating, from the server to the client device, a response to the command request for receipt by the client device, the response indicating whether the command request is allowed based on whether the verification signature matches the command signature in the received command request.

2. A computer-implemented method as recited in claim 1, wherein the command parameters include one or more of:
   a request to encrypt data;
   a request to decrypt data; or
   a request for access to a security asset.

3. A computer-implemented method as recited in claim 1, wherein said generating includes utilizing a client value to generate the verification signature, the client value indicating a boot state of the client device.

4. A computer-implemented method as recited in claim 1, wherein said generating includes extending the device key with a known good measurement of a code component of the client device.

5. A computer-implemented method as recited in claim 1, further comprising:
   responsive to ascertaining that the verification signature matches the command signature, performing the command request; and
   wherein the response further indicates said performance of the command request.

6. A computer-implemented method as recited in claim 1, further comprising:
   responsive to said ascertaining, encrypting a response to the command request for receipt by the client device indicating whether the command request is allowed; and
   wherein said communicating the response comprises communicating the encrypted response to the client device.

7. A computer-implemented method as recited in claim 1, further comprising:
   receiving a request to change a trust status of the client device, the request including a request signature;
   generating a different verification signature based on the change request; and
   changing the trust status of the client device responsive to ascertaining that the request signature matches the different verification signature.

8. A computer-implemented method as recited in claim 1, further comprising: receiving a request from a device authority to change a trust status of the client device; and responsive to said receiving the request, changing the trust status of the client device independent of interaction with the client device.

9. A computer-implemented method as recited in claim 8, wherein said changing the trust status includes one or more of: provisioning a new security asset for the client device; or revoking an existing security asset of the client device.

10. A system comprising:
    one or more processors; and
    one or more computer-readable storage media storing computer-executable instructions that, responsive to execution by the one or more processors, cause the system to perform operations including:
      receiving an encrypted command request from a client device;
      decrypting the encrypted command request to expose a device identifier for the client device, command parameters, and a command signaturee generated by the client device based on a client device key stored at the client device and the command parameters, the command parameters requesting interaction with a security environment that is remote from the client device;

generating a verification signature utilizing a server device key associated with the exposed device identifier and stored at the system and the command parameters in the received command request;

ascertaining whether to allow the command request from the client device based on a comparison of the generated verification signature and the command signature received with the command request; and communicating, to the client device, a response to the command request for receipt by the client device, the response indicating whether the command request is allowed based on whether the verification signature matches the command signature in the received command request.

11. A system as recited in claim 10, wherein said generating includes utilizing a client value to generate the verification signature, the client value indicating a boot state of the client device.

12. A system as recited in claim 10, wherein said generating includes extending the device key with a known good measurement of a code component of the client device.

13. A system as recited in claim 10, the operations further including:
   responsive to ascertaining that the verification signature matches the command signature, performing the command request; and
   wherein the response further indicates said performance of the command request.

14. A system as recited in claim 10, the operations further including:
   receiving a request to change a trust status of the client device, the request including a request signature;
   generating a different verification signature based on the change request; and
   changing the trust status of the client device responsive to ascertaining that the request signature matches the different verification signature.

15. A computer-implemented method, comprising:
   receiving, at a server, an encrypted command request from a client device;
   decrypting, at the server, the encrypted command request to expose a device identifier for the client device, a command signature, and command parameters including a current client value for the client device, the current client value indicating a boot state of the client device, wherein the command signature is generated by the client device based on a client device key stored at the client device and the command parameters;
   generating, at the server, a service value for communication to the client device;
   generating, at the server, a verification signature utilizing a server device key associated with the exposed device identifier and stored at the server and the command parameters in the received command request;
   ascertaining whether to allow the command request based on whether the generated verification signature matches the command signature received with the command request; and
   communicating, to the client device, a response to the command request for receipt by the client device, the response including the service value and data indicating whether the command request is allowed based on whether the verification signature matches the command signature in the received command request.

16. A computer-implemented method as recited in claim 15, wherein said generating the verification signature includes extending the device key with a known good measurement of a code component of the client device.

17. A computer-implemented method as recited in claim 15, wherein the command parameters further include one or more of:
   a request to encrypt data;
   a request to decrypt data; or
   a request for access to a security asset.

18. A computer-implemented method as recited in claim 15, further comprising:
   responsive to ascertaining that the verification signature matches the command signature, performing the command request; and
   wherein the response further indicates said performance of the command request.

19. A computer-implemented method as recited in claim 15, further comprising changing a trust status of the client device independent of interaction with the client device, said changing the trust status including one or more of:
   provisioning a new security asset for the client device; or
   revoking an existing security asset of the client device.

20. A computer-implemented method as recited in claim 15, wherein the service value is configured to enable the client device to authenticate a further received communication.

* * * * *